Oct. 4, 1966  F. WEILER  3,276,260
TEMPERATURE CONTROL GAUGE
Filed Feb. 19, 1964  2 Sheets-Sheet 1
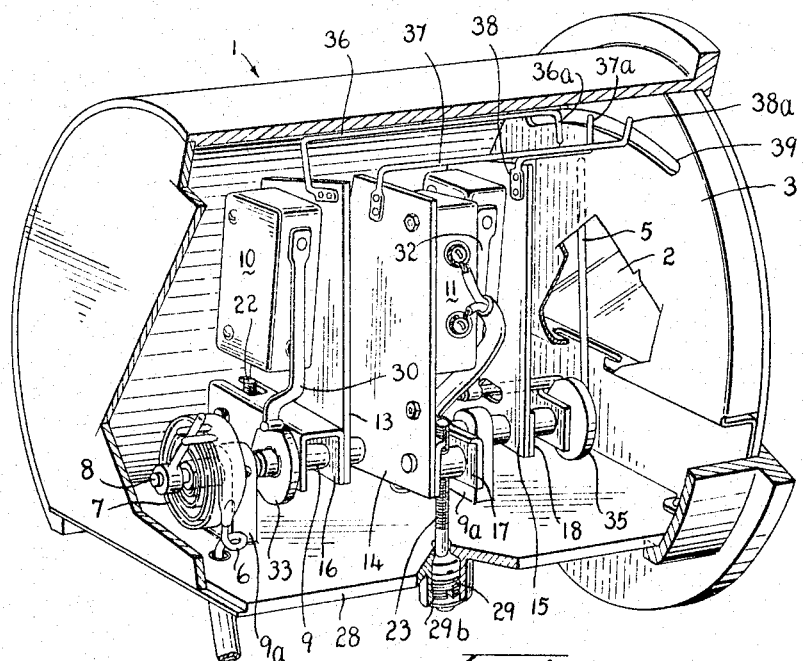
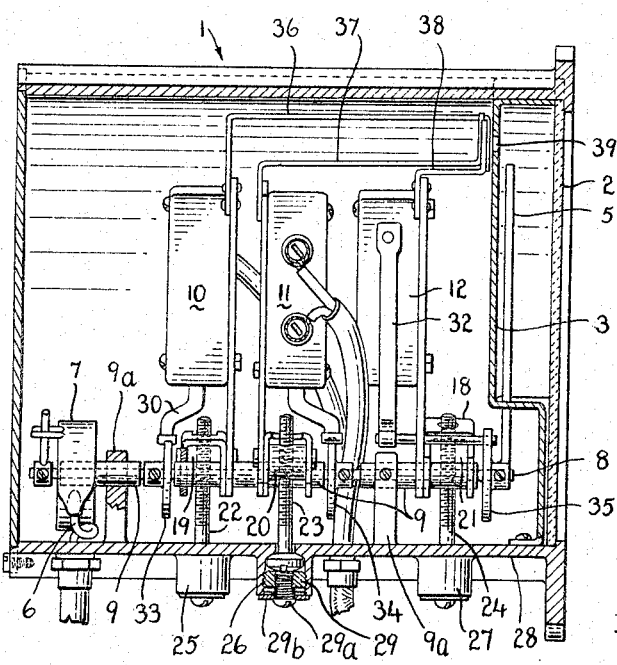
INVENTOR
FRITZ WEILER
BY
ATTORNEY

United States Patent Office 3,276,260
Patented Oct. 4, 1966

3,276,260
TEMPERATURE CONTROL GAUGE
Fritz Weiler, 8 Boylen St., Weston, Ontario, Canada
Filed Feb. 19, 1964, Ser. No. 345,905
3 Claims. (Cl. 73—368.6)

This invention relates in general to temperature control indicators or gauges of the sealed type used to sense the temperature and control operation of units such as power transformers and the like.

Control gauges of this type are usually provided with a Bourdon tube connected to a remote sensing assembly by a capillary tube.

In order to control the operation of transformers, etc., control circuits and the micro-switches which control the circuits, are enclosed within the gauge housing responsive at preselected temperature levels to effect operation of pumps, fans and/or alarm signals and the like.

Generally, such controls are factory preset to customer specifications as the setting of control-temperature mechanisms in the presently known types requires dismantling of the usual bezel ring, outer "O"-ring gasket, protective glass and inner "O"-ring gasket, thus, a mere visual inspection of prior control gauge does not reveal the specific setting of each control circuit.

Further, in adjusting the usual micro-switch relative to its actuating cam means, the arcuate slot and locking screw expedient is usually employed, an expedient which renders adjustment both tedious and difficult where accuracy is required.

In view of the prior art problems it is a primary object of this invention to set forth a temperature control gauge of the foregoing type wherein adjustment of control-temperatures may be made externally of the sealed housing.

It is a further object to provide a temperature control gauge of the multiple control class wherein each control may be individually adjusted externally of the housing and wherein the free movement of the pointer over the dial range is not in any way affected.

A still further object of the present invention is the provision of novel sealing means for the external adjusting means such that the instrument is weather-proofed for outside use.

Another object of this invention is to provide a visual aid for control-temperature adjustment whereby such adjustments are facilitated and also, at a glance, the setting of the instrument is known at any given time.

The manner in which the foregoing objects are achieved will be understood from the following detailed description taken in conjunction with the appended drawings in which:

FIG. 1 is a cut-away perspective view of the temperature gauge;

FIG. 2 is a side view of the temperature gauge with the housing cut-away;

Figure 3:
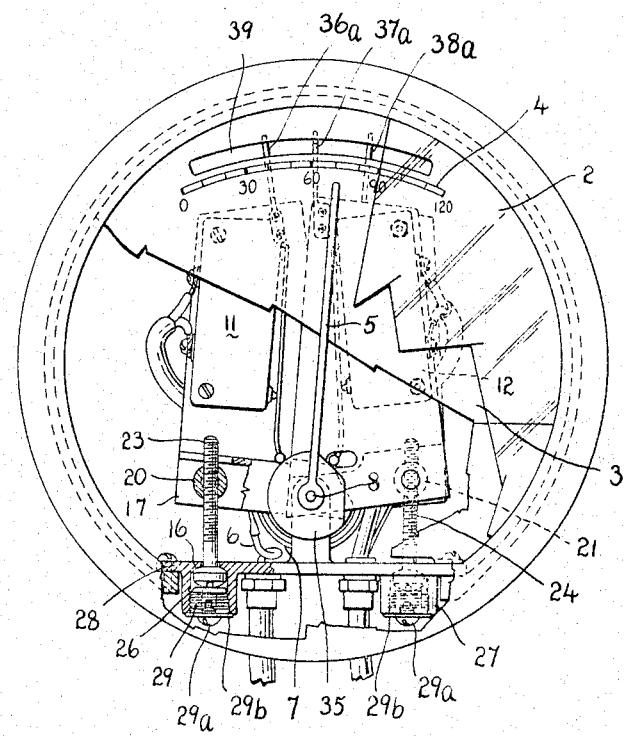
FIG. 3 is a front view of the gauge partially cutaway to reveal the inner mechanisms.

The temperature control gauge incorporating the instant invention and as shown in FIGS. 1, 2 and 3 is of the type having a substantially sealed housing generally designated by the numeral 1 with a protective glass window 2 and indicating dial 3. The dial 3 bears a graduated scale 4 (FIG. 3) denoting the operative range of the gauge and in conjunction with an indicating needle or pointer 5 records the temperature at a given location by means of the well known remote sensing means comprising a heat exchanger element and thermometer bulb (not shown). Again, in known manner, a capillary tube, partially shown at 6, leads from the sensing element to a Bourdon tube 7 which actuates or rotates shaft 8 to which pointer 5 is secured. The circuits and switches used herein are well known per se, and form no part of the present invention, thus details are not deemed necessary herein.

In gauges of the type herein under discussion, one or more control circuits are provided such that on certain temperatures being attained, the control circuits are actuated, that is the shaft 8 has rotated sufficiently for a cam riser portion to contact a switch arm and close the control circuit. For example, one control circuit may be used to initiate operation of a unit upon the latter attaining a required operational temperature. A second control may be used to signal an alarm if and when the unit reaches a maximum allowed temperature.

The embodiment illustrated in the appended drawings shows three control circuits and in so far as the electrical equipment is concerned follows conventional practice. That is, micro-switches actuated by cam means are used to actuate each control circuit.

Turning to FIGS. 1 and 2, it will be seen that micro-switches 10, 11 and 12 are mounted upon switch-mounting boards 13, 14 and 15 which in turn, are mounted upon inverted, U-shaped brackets 16, 17 and 18.

The brackets 16, 17 and 18 mounted adjacent one end thereof about shaft 8, for pivotal movement thereon, but the brackets do not rotate with shaft 8. Each bracket pivots about a fixed bushing 9 supported and retained in columns 9a. Shaft 8 rotates in bushings 9.

Adjacent the other end of the brackets 16, 17 and 18 nuts 19, 20 and 21 are fixedly housed for respective cooperation with adjusting screws 22, 23 and 24 which extend into the housing through integral tubular boss elements 25, 26 and 27. As shown, screwhead seats are formed in the bosses defining holes in the base portion 28 of the housing. The abutment of the screw heads against the seats assists in maintaining the sealed condition of the housing.

The internal surfaces of bosses 25, 26 and 27 threaded to receive annular, internally threaded grub screws 29 (best seen in FIG. 3) which function to retain the adjusting screw heads in the boss elements during adjustment thereof and to lock the adjusting means in a desired setting. The internal thread of the grub screw is provided to accommodate a sealing screw 29a and a gasket washer 29b. Further, the annular characteristic of the grub screw permits manipulation of the adjusting screws while the latter are retained in the bosses.

The switch adjusting means is provided to vary the position of the switch arms 30, 31 and 32 with respect to the actuating cams 33, 34 and 35. The cams are fixedly mounted on shaft 8 in known manner for rotation therewith and the positional relationship between the cam and the switch arm governs the temperature at which the control circuit is activated.

By mounting the switch means for pivotal adjustment relative to the cams on the same pivotal axis as the indicating pointer 5, it becomes possible to indicate control-temperature settings on the temperature dial thus obviating the tedious trial and error methods characterisc of prior art devices.

For example, in prior art gauges of the instant type it is necessary to immerse the sensing element in surroundings maintained at the temperature at which a given control is to be initiated and then adjust the associated cam or switch position, usually by means of the relatively inaccurate slot and screw expedient until the correct setting is achieved.

The present invention overcomes this problem by connecting control-temperature indicators 36, 37 and 38 to switch mounting boards 13, 14 and 15 from whence said indicators extend to the rear face of dial 3 terminating in indicator portions 36a, 37a and 38a (FIG. 3) which are visible in control temperature indicating relationship with the graduated scale 4 through a slot 39 cut in the dial 3 immediately above and extending in parallel relationship with the scale 4. With this novel arrangement, the factory need only correlate the mounting position of the control temperature indicators with the mounting of the switch means in relation to the cams and the customer can then adjust the control temperature settings to meet his own specifications.

Such adjustment is made simply by removing sealing screw 29a, turning the adjusting screw 23 until the associated control temperature indicator is aligned with the required temperature on the dial scale 4, and then locking the adjusting screw by engagement therewith of grub screw 29. The sealing screw and gasket are then replaced. In order to further facilitate setting adjustments, the control indicator portions 36a, 37a and 38a may be color-coded as may be the tubular boss elements in which the adjusting screw heads are located.

It is herein noted that the embodiment shown and described is to be taken as illustrative only and having read the foregoing disclosure, various modifications may well become apparent to those skilled in this art while remaining within the spirit and substance of this invention, therefore, the applicant wishes to be limited only by the scope of the claims appended hereto.

What I claim as new and desire to protect by Letters Patent of the United States is:

1. In a dial-type temperature controlling gauge having, within a sealed housing, pressure responsive means; an indicating-pointer shaft actuated by said pressure responsive means; a plurality of electric control circuits and a cam-actuated switch means for each control circuit; the invention herein comprising, (a) switch-mounting means for each switch pivotally mounted about the longitudinal axis of the indicating-pointer shaft;

(b) cam means for each switch fixedly secured to and rotatable with said shaft operative by engaging with a switch actuating member carried by its related switch when a preselected temperature is attained;

(c) control-temperature-indicating means secured to each switch-mounting means to indicate visual control-temperature settings on the dial, and (d) switch-mounting adjusting means for each switch mounting means extending into the housing and engaging the switch-mounting means to selectively position said switch actuating member relative to said cam means thereby to preselect the temperature at which each switch actuating member is to operate, each switch-mounting adjusting means including a tubular boss element integral with and extending outwardly of said housing; screw means in said boss element and extending into said housing for adjusting engagement with said switch-mounting means, and locking means in said boss element operable to selectively lock said screw means; sealing means engageable with the locking means to seal said boss element.

2. The device set forth in claim 1 wherein each control-temperature indicating means extends to a location adjacent the inner face of the dial; a slot formed in said dial above and parallel to a graduated scale whereby the control-temperature indicating means are visible in co-operative relationship with said graduated scale.

3. The device set forth in claim 1 wherein the locking means comprises an annular, internally threaded grub screw and said sealing means comprises a headed screw and gasket washer, engageable with the internal thread of said grub screw.

References Cited by the Examiner

UNITED STATES PATENTS 3,144,771   8/1964   Leupold _____ 73—343

FOREIGN PATENTS 614,264   2/1961   Canada.

LOUIS R. PRINCE, *Primary Examiner.*

J. RENJILIAN, *Assistant Examiner.*